United States Patent
Lee et al.

(10) Patent No.: US 8,243,697 B2
(45) Date of Patent: Aug. 14, 2012

(54) APPARATUS AND METHOD OF TRANSMITTING DATA BLOCK ON UPLINK FREQUENCIES

(75) Inventors: Kyung Jun Lee, Anyang-si (KR); Sun Hee Kim, Anyang-si (KR); Seung June Yi, Anyang-si (KR); Sung Hoon Jung, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 12/860,274

(22) Filed: Aug. 20, 2010

(65) Prior Publication Data

US 2011/0044297 A1 Feb. 24, 2011

Related U.S. Application Data

(60) Provisional application No. 61/235,708, filed on Aug. 21, 2009, provisional application No. 61/247,940, filed on Oct. 1, 2009.

(30) Foreign Application Priority Data

Aug. 19, 2010 (KR) .................. 10-2010-0080331

(51) Int. Cl.
*H04J 3/00* (2006.01)

(52) U.S. Cl. ........................................ 370/336
(58) Field of Classification Search .......... 370/310–350
See application file for complete search history.

(56) References Cited

U.S. PATENT DOCUMENTS

| | | |
|---|---|---|
| 2005/0047393 A1 | 3/2005 | Liu |
| 2005/0237932 A1 | 10/2005 | Liu |
| 2007/0008927 A1 | 1/2007 | Herz et al. |
| 2011/0090806 A1* | 4/2011 | Ozturk et al. ................ 370/252 |

* cited by examiner

*Primary Examiner* — Hassan Kizou
*Assistant Examiner* — Charles C Jiang
(74) *Attorney, Agent, or Firm* — McKenna Long & Aldridge LLP

(57) ABSTRACT

A method and apparatus of generating a data block for a plurality of uplink frequencies is provided. The apparatus determines a size of a data field of the data block so that each data block matches a minimum of a first amount of data and second amount of data. The first amount of data is allowed to be transmitted by a first grant on a first uplink frequency and the second amount of data is allowed to be transmitted by a second grant on a second uplink frequency. The apparatus generates at least one data block so that the amount of data in the generated data blocks is less than multiple times the minimum of the first amount of data and the second amount of data.

9 Claims, 14 Drawing Sheets

FIG. 12
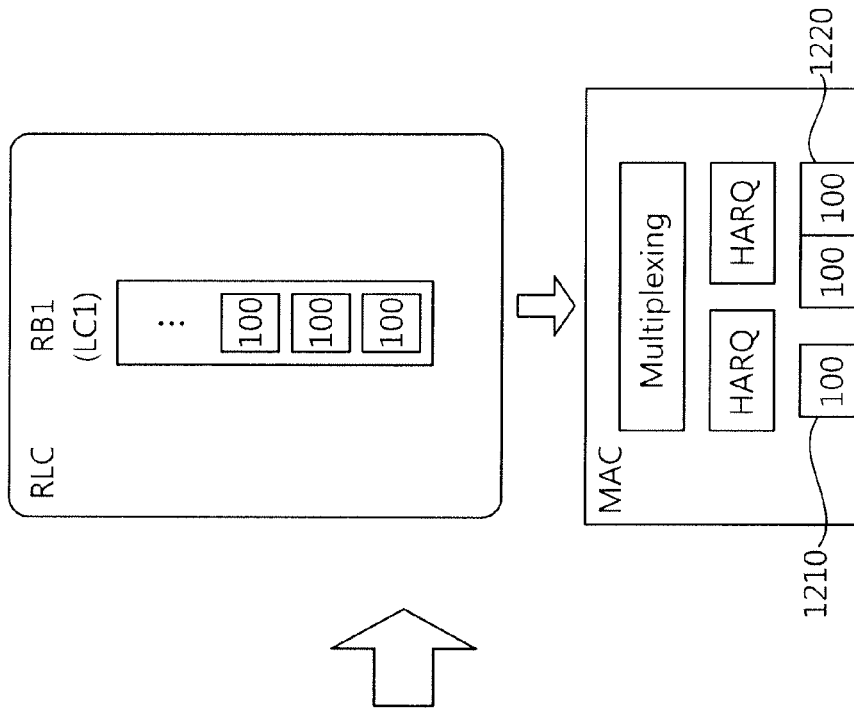
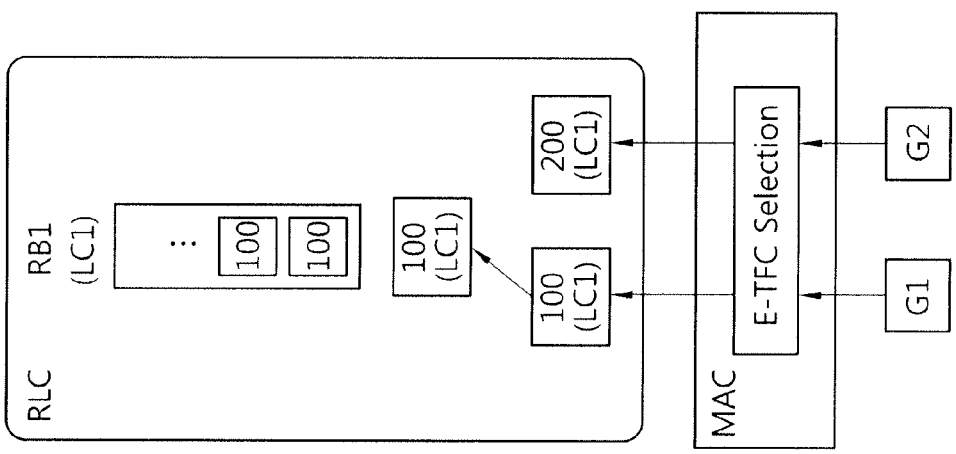

APPARATUS AND METHOD OF TRANSMITTING DATA BLOCK ON UPLINK FREQUENCIES

CROSS-REFERENCE TO RELATED APPLICATIONS

This application claims the benefit of priority of U.S. Provisional applications 61/235,708 filed on Aug. 21, 2009, 61/247,940 filed on Oct. 1, 2009, and Korean Patent Application No. 10-2010-0080331 filed on Aug. 19, 2010, all of which are incorporated by reference in their entirety herein.

BACKGROUND OF THE INVENTION

1. Field of the Invention

The present invention relates to wireless communications, and more particularly, to a method and apparatus for generating and transmitting a data block on a plurality of uplink frequencies in a wireless communication system.

2. Related Art

Wireless communication systems are widely deployed to provide various types of communication content such as voice and data. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, orthogonal frequency division multiple access (OFDMA) systems, and the like. Additionally, the systems can conform to specifications such as third generation partnership project (3GPP), High Speed Packet Access (HSPA), High Speed Downlink Packet Access (HSDPA), High Speed Uplink Packet Access (HSUPA), 3GPP long-term evolution (LTE), etc.

As wireless communications continue to grow in popularity, users demand greater performance such as high data rates. One option to acquire higher data rates is to increase bandwidth by implementing carrier aggregation. Carrier aggregation uses a plurality of carriers (or a plurality of frequencies). For instance, a base station can transmit data on a plurality of downlink carriers and a user equipment can transmit data on a plurality of uplink carriers. Accordingly, greater overall throughput can be achieved without a large impact on equipment complexity.

Radio interface protocols of convention systems are designed based on a single carrier. It may be inefficient if the conventional radio interface protocols are applied in multiple carriers.

SUMMARY OF THE INVENTION

The present invention provides a method and apparatus for generating a data block for a plurality of carriers.

The present invention also provides a method and apparatus for transmitting a data block on a plurality of carriers.

In an aspect, a method of generating a data block for a plurality of uplink frequencies is provided. The data block may include a header and a data field. The method includes determining a size of the data field of the data block so that each data block matches a minimum of a first amount of data and second amount of data, the first amount of data being allowed to be transmitted by a first grant on a first uplink frequency, the second amount of data being allowed to be transmitted by a second grant on a second uplink frequency, and generating at least one data block so that the amount of data in the generated data blocks is less than multiple times the minimum of the first amount of data and the second amount of data.

The data block may be a Radio Link Control Protocol Data Unit (RLC PDU).

The first amount of data may be a maximum amount of data allowed to be transmitted by the first grant, and the second amount of data may be a maximum amount of data allowed to be transmitted by the second grant.

The generated RLC PDUs may be submitted to a Medium Access Control (MAC) layer through a logical channel.

The generated data blocks may be transmitted in a later transmission time interval (TTI).

The amount of data in the generated data blocks may be less than or equal to eight times the minimum of the first amount of data and the second amount of data.

The first uplink frequency may be a primary uplink frequency and the second uplink frequency may be a secondary uplink frequency.

In another aspect, a wireless apparatus comprising a processor for implementing a Radio Link Control (RLC) layer and generating a data block for a plurality of uplink frequencies is provided. The processor is configured for determining a size of a data field of the data block so that each data block matches a minimum of a first amount of data and second amount of data, the first amount of data being allowed to be transmitted by a first grant on a first uplink frequency, the second amount of data being allowed to be transmitted by a second grant on a second uplink frequency, and generating at least one data block so that the amount of data in the generated data blocks is less than multiple times the minimum of the first amount of data and the second amount of data.

In still another aspect, a method of transmitting data blocks on a plurality of uplink frequencies is provided. The method includes acquiring a plurality of first uplink grants for the plurality of uplink frequencies, determining a reference value based on the plurality of first uplink grants, generating at least one upper data block based on the reference value, acquiring a plurality of second uplink grants for the plurality of uplink frequencies, generating a plurality of lower data blocks based the plurality of second uplink grants by multiplexing the at least one upper data block, and transmitting each of the plurality of lower data blocks on each of the plurality of uplink frequencies.

The step of determining the reference value may include for each of the plurality of first uplink grants, determining an amount of data allowed to be transmitted by each first uplink grant, and selecting a minimum of the determined amounts of data allowed as the reference value.

The step of generating the at least one upper data block may include determining a size of a data field of an upper data block so that each upper data block matches the reference value, and generating the at least one upper data block so that the amount of data in the generated upper data blocks is less than or equal to eight times the reference value.

In still another aspect, a wireless apparatus of transmitting data blocks on a plurality of uplink frequencies is provided. The wireless apparatus includes a processor for implementing a radio interface protocol layer, and a radio interface unit operatively coupled with the processor and configured for transmitting each of a plurality of lower data blocks on each of the plurality of uplink frequencies, wherein the processor is configured for acquiring a plurality of first uplink grants for the plurality of uplink frequencies, determining a reference value based on the plurality of first uplink grants. generating at least one upper data block based on the reference value, acquiring a plurality of second uplink grants for the plurality of uplink frequencies, and generating the plurality of lower data blocks based the plurality of second uplink grants by multiplexing the at least one upper data block.

A user equipment pre-generates a radio link control (RLC) protocol data unit (PDU) by considering a plurality of uplink grants for a plurality of frequencies. When the RLC PDU is multiplexed or de-multiplexed to or from a medium access control (MAC) PDU, complexity can be decreased. In addition, RLC PDUs corresponding to an amount of data suitable for the plurality of frequencies can be provided.

BRIEF DESCRIPTION OF THE DRAWINGS

FIG. 12 shows an example of implementing the proposed method.

DESCRIPTION OF EXEMPLARY EMBODIMENTS

Figure 1:
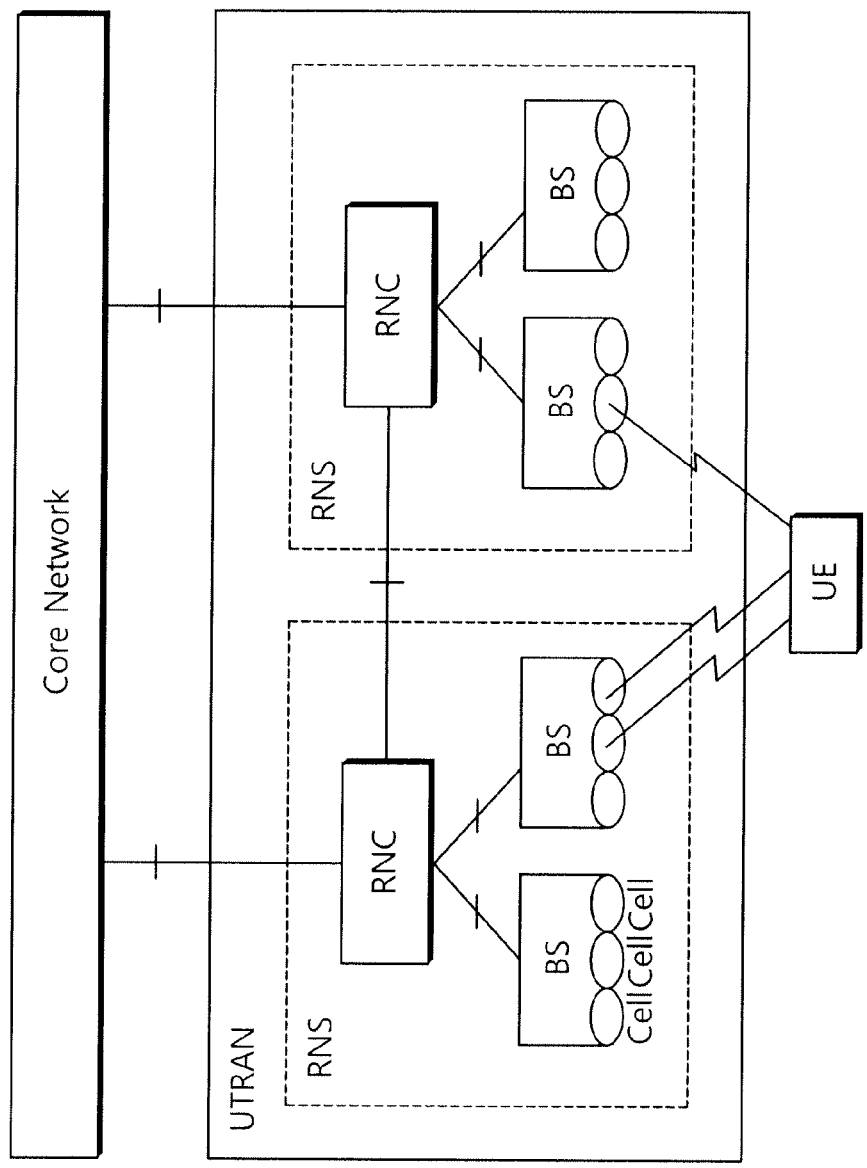
FIG. 1 shows a universal mobile telecommunications system (UMTS) network to which the present invention is applied.

FIG. 1 shows a universal mobile telecommunications system (UMTS) network to which the present invention is applied.

A core network (CN) relays subscriber traffic. A UMTS terrestrial radio access network (UTRAN) includes one or more radio network systems (RNSs). The RNS includes a radio network controller (RNC) and a base station (BS). The coverage of the BS serves one or more cells.

The BS provides a control plane and a user plane to a user equipment (UE).

The UE may be fixed or mobile, and may be referred to as another terminology, such as a mobile station (MS), a user terminal (UT), a subscriber station (SS), a mobile terminal (MT), a wireless device, etc. The BS is generally a fixed station that communicates with the UE and may be referred to as another terminology, such as a node-B, a base transceiver system (BTS), an access point, etc.

Figure 2:
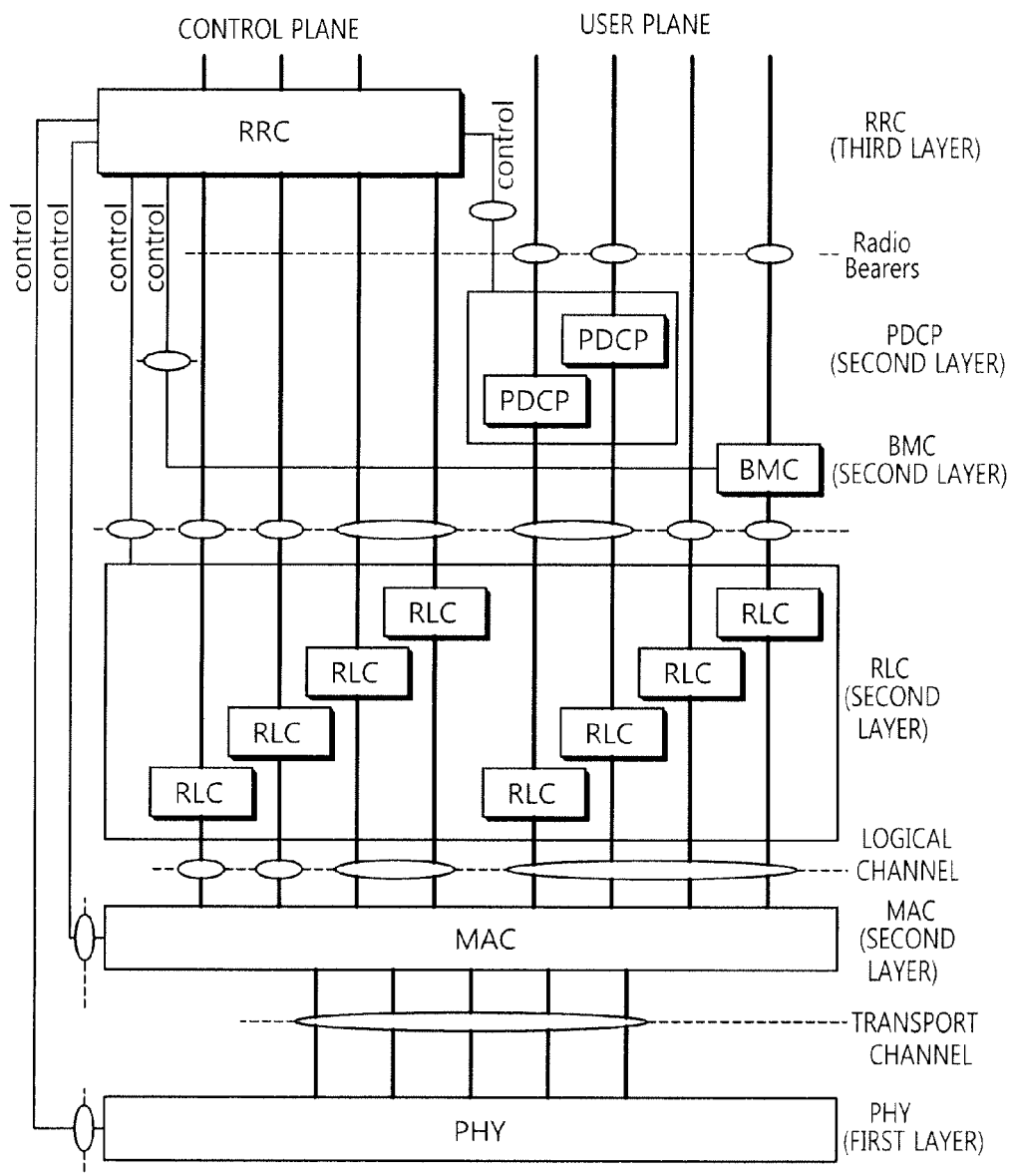
FIG. 2 shows a structure of a radio protocol in a UMTS.

FIG. 2 shows a structure of a radio protocol in the UMTS.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The user plane is a protocol stack for user data transmission. The control plane is a protocol stack for control signal transmission.

The PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. According to whether a channel is shared, the transport channel is classified into a dedicated transport channel and a common transport channel.

Functions of the MAC layer include mapping between a logical channel and a transport channel and logical channel multiplexing/de-multiplexing for mapping a plurality of logical channels onto one transport channel. The MAC layer provides a service to a radio link control (RLC) layer through the logical channel.

According to a type of information to be transmitted, the logical channel is classified into a control channel for transmitting control plane information and a traffic channel for transmitting user plane information.

According to a type of the transport channel specifically managed, the MAC layer is classified into a MAC-b sublayer, a MAC-d sublayer, a MAC-c/sh sublayer, a MAC-hs/ehs sublayer, and a MAC-e/es or MAC-i/is sublayer. The MAC-b sublayer serves to manage a broadcast channel (BCH) which is a transport channel that serves to broadcast system information. The MAC-c/sh sublayer manages a common transport channel (e.g., a forward access channel (FACH) or a downlink shared channel (DSCH)) shared by other UEs. The MAC-d sublayer serves to manage a dedicated channel (DCH) which is a dedicated transport channel for a specific UE. In order to support fast data transmission in downlink and uplink, the MAC-hs/ehs sublayer manages a high speed downlink shared channel (HS-DSCH) which is a transport channel for high speed downlink data transmission. The MAC-e/es or MAC-i/is sublayer manages an enhanced dedicated channel (E-DCH) which is a transport channel for high speed uplink data transmission.

Functions of the RLC layer serve to ensure a quality of service (QoS) required by each radio bearer (RB) and data transmission depending on the QoS. To ensure a unique QoS of each RB, one or two independent RLC entities exist for each RB. To support various QoSs, the RLC layer provides three operation modes, i.e., a transparent mode (TM), an unacknowledged mode (UM), and an acknowledged mode (AM). In order to regulate a data size suitable for transmission performed by an upper layer by using a radio medium, the RLC layer also performs a function for segmenting and concatenating data received from an upper layer.

A PDCP layer is an upper layer of the RLC layer, and performs header compression. The PDCP layer is generally present in a packet switched (PS) domain since its basic function is header compression. One PDCP entity is provided for each RB.

A broadcast/multicast control (BMC) layer belonging to the second layer is an upper layer of the RLC layer, and performs a function of scheduling a cell broadcast message.

The radio resource control (RRC) layer belonging to the third layer is defined only in the control plane. The RRC layer serves to control the logical channel, the transport channel, and the physical channel in association with configuration, reconfiguration and release of radio bearers (RBs).

The RB is a logical path provided by the first layer (i.e., the PHY layer) and the second layer (i.e., the MAC layer, the RLC layer, and the PDCP layer) for data delivery between the UE and the UTRAN. Establishment of the RB implies a process for specifying characteristics of a radio protocol layer and a channel to provide a specific service and for determining each of specific parameters and operational methods.

Hereinafter, a MAC layer will be described in greater detail. The MAC layer provides a service to an upper layer, i.e., an RLC layer, through a logical channel.

Figure 3:
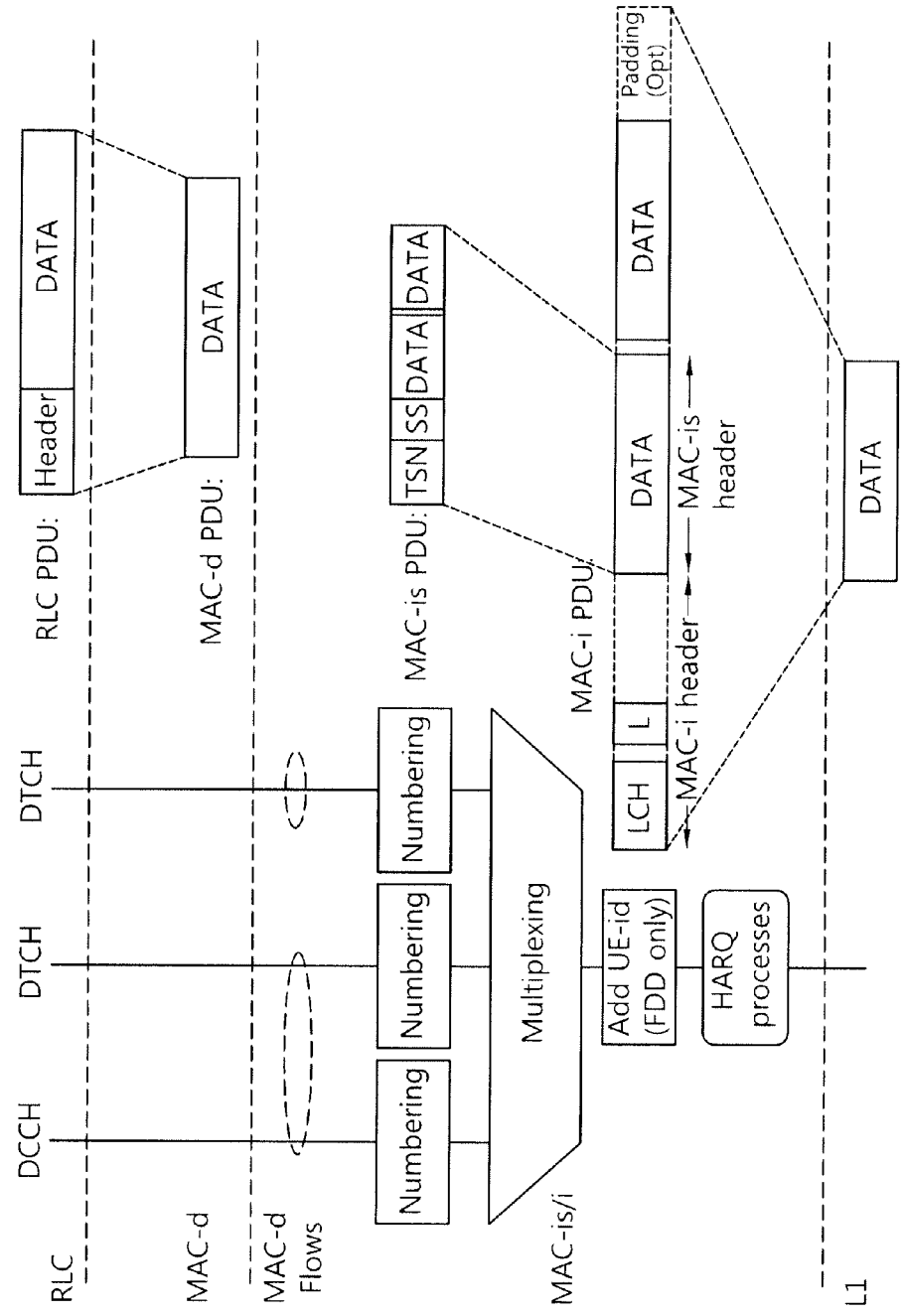
FIG. 3 shows a structure of a dedicated channel (DCH) and an enhanced dedicated channel (E-DCH).

FIG. 3 shows a structure of a DCH and an E-DCH.

Both of the DCH and the E-DCH are dedicated transport channels used to transmit uplink data by a UE to a UTRAN. The E-DCH supports a higher speed than the DCH, and supports hybrid automatic repeat request (HARQ), adaptive modulation and coding (AMC), BS controlled scheduling, etc.

For the E-DCH, a BS transmits downlink control information to the UE to control E-DCH transmission of the UE. The downlink control information includes an ACK/NACK signal for the HARQ, channel quality information (CQI) for the AMC, E-DCH rate allocation for the BS controlled scheduling, an E-DCH transmission start time, E-DCH transmission time duration allocation, a transport block size, etc.

The UE transmits uplink control information to the BS. The uplink control information includes E-DCH rate request for the BS controlled scheduling, a UE buffer status, a UE power status, etc.

The uplink control information and the downlink control information for the E-DCH are transmitted through a physical control channel such as an enhanced dedicated physical control channel (E-DPCCH).

For the E-DCH, a MAC-d flow is defined between MAC-d and MAC-i. The dedicated logical channel is mapped to the MAC-d flow. The MAC-d flow is mapped to the transport channel E-DCH. The transport channel E-DCH is mapped again to an enhanced dedicated physical data channel (E-DPDCH).

The dedicated logical channel may be directly mapped to the transport channel DCH. The transport channel DCH is mapped to a dedicated physical data channel (DPDCH).

A MAC-d sublayer serves to manage a dedicated channel (DCH) which is a dedicated transport channel for a specific UE. A MAC-i sublayer serves to manage the E-DCH used for fast transmission of uplink data.

A MAC-d sublayer of a transmitter constructs a MAC-d protocol data unit (PDU) from a MAC-d service data unit (SDU) submitted by an upper layer, i.e., the RLC layer. A MAC-d sublayer of a receiver restores A MAC-d SDU from A MAC-d PDU received from a lower layer and delivers the restored MAC-d SDU to an upper layer.

The MAC-d sublayer exchanges the MAC-d PDU with the MAC-i sublayer through the MAC-d flow or exchanges the MAC-d PDU with a PHY layer through the DCH. By using a MAC-d header attached to the MAC-d PDU, the MAC-d sublayer of the receiver restores the MAC-d SDU and delivers the restored MAC-d SDU to an upper layer.

The MAC-i sublayer of the transmitter constructs a MAC-i PDU from the MAC-i SDU, i.e., the MAC-d PDU delivered from an upper layer, i.e., the MAC-d sublayer. The MAC-i sublayer of the receiver restores the MAC-i SDU from the MAC-i PDU received from a lower layer, i.e., the PHY layer, and delivers the restored MAC-i SDU to an upper layer. The MAC-i sublayer exchanges the MAC-i PDU with the PHY layer through the E-DCH. By using a MAC-i header attached to the MAC-i PDU, the MAC-i of the receiver restores the MAC-i SDU and delivers the restored MAC-i SDU to an upper layer.

The RLC PDU is constructed in the RLC layer, and includes a header and a data field. RLC SDU(s) or segments of the RLC SDU are mapped to the data field. The format of RLC PDU may refer to the section 9 of the 3GPP TS 25.322 V8.4.0 (2009-03) "Radio Link Control (RLC) protocol specification (Release 8)" which is incorporated herein by reference.

Figure 4:
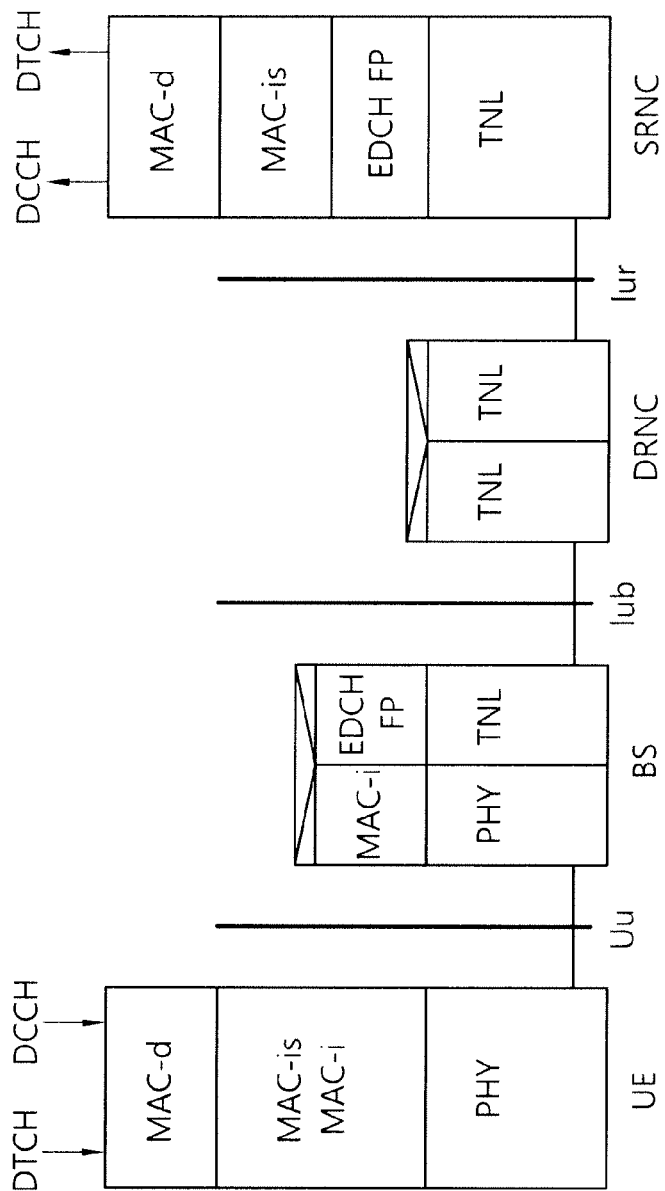
FIG. 4 shows a protocol model for an E-DCH.

FIG. 4 shows a protocol model for an E-DCH.

A MAC-i sublayer supporting the E-DCH exists below a MAC-d sublayer of a UTRAN and a MAC-d sublayer of a UE. The MAC-i sublayer of the UTRAN is located in a BS. The MAC-d of the UTRAN is located in an SRNC that serves to manage the UE. There are the MAC-i sublayer and the MAC-d sublayer in the UE.

Hereinafter, transmission of control information for an E-DCH will be described.

A scheduler of a BS serves to perform optimal radio resource allocation to a UE in a cell in order to increase transmission efficiency of uplink data. For example, a large number of radio resources are allocated to a UE having a good radio channel state, and a small number of radio resources are allocated to a UE having a poor radio channel state.

However, in order for the scheduler to allocate suitable radio resources to the UE, not only a radio channel state but also information such as power that can be used by the UE for the E-DCH, an amount of data to be transmitted by the UE, etc., is required. Even though the UE operates under a good channel condition, if there is no remaining power that can be used for the E-DCH or if there is no remaining uplink data, the scheduler does not have to allocate the radio resources to the UE.

Therefore, the UE needs to send uplink control information to the scheduler of the BS. There are several methods for transmitting the uplink control information. For example, the BS may instruct the UE to report to the BS an amount of uplink data when the data amount exceeds a specific range, or may instruct the UE to send the uplink control information periodically.

When the radio resource is allocated to the UE by the scheduler of the BS, the UE constructs a MAC PDU within the allocated radio resource and transmits the constructed MAC PDU to the BS through the E-DCH.

If there is uplink data to be transmitted by the UE, the UE sends the uplink control information to the BS to request allocation of the radio resource. The BS sends radio resource allocation information to the UE on the basis of the uplink control information. Herein, the radio resource allocation information is also referred to as an uplink grant, and can be expressed in various forms such as a maximum value of uplink power, a ratio with respect to a reference channel, or the like. The UE generates a MAC PDU on the basis of the uplink grant.

In a UMTS, the radio resource allocation information is classified into two types. One is an absolute grant (AG), and the other is a relative grant (RG). The AG is used to report an absolute value of a grant that can be used by the UE. The RG is used to report a difference value of a grant with respect to a grant used by the UE in a previous time (e.g., a previous transmission time interval (TTI)).

When the UE requests resource allocation, the BS allocates a radio resource to the UE by using the AG. The UE sets a serving grant (SG) to the AG, and then transmits uplink data within the range of the SG. Thereafter, the BS considers channel condition, a UE buffer, interference, etc. For example, the BS sends an RG which allows the UE to decrease the SG by one step if the signal strength of the UE is too strong to cause too much interference to other UE. In opposite case, the BS sends an RG which allows the UE to increase the SG by one step. The UE adjusts the SG on the basis of the received RG, and uses the radio resource within the range of the SG.

The UE performs E-DCH transport format combination (E-TFC) selection by using the SG, and determines an amount of data allowed to be transmitted through the E-DCH in a current TTI. Each RLC PDU matches an amount of data allowed to be transmitted by a grant.

The grant can be classified into a scheduled grant and a non-scheduled grant. In case of the scheduled grant, a grant to be used is acquired in every TTI. In case of the non-scheduled grant, an available grant (or a data amount) is predetermined so that the predetermined grant is used even if a grant is not received from the BS. Hereinafter, the grant may be either the scheduled grant or the non-scheduled grant. Alternatively, the grant may be a combination of the scheduled grant and the non-scheduled grant.

Hereinafter, E-DCH transport format combination (E-TFC) selection will be described.

In one MAC PDU, one or more RLC PDUs may be multiplexed from one or more logical channels. One logical channel corresponds to one RB. Multiplexing can be achieved from the RLC PDU of a logical channel having high priority to a MAC PDU.

The E-TFC selection is an operation of determining an amount of data for each logical channel (or for each RB) to be multiplexed (or transmitted) in a current (or next) TTI, on the basis of power that can be used by a UE for E-DCH transmission and an uplink grant received from a BS.

Figure 5:
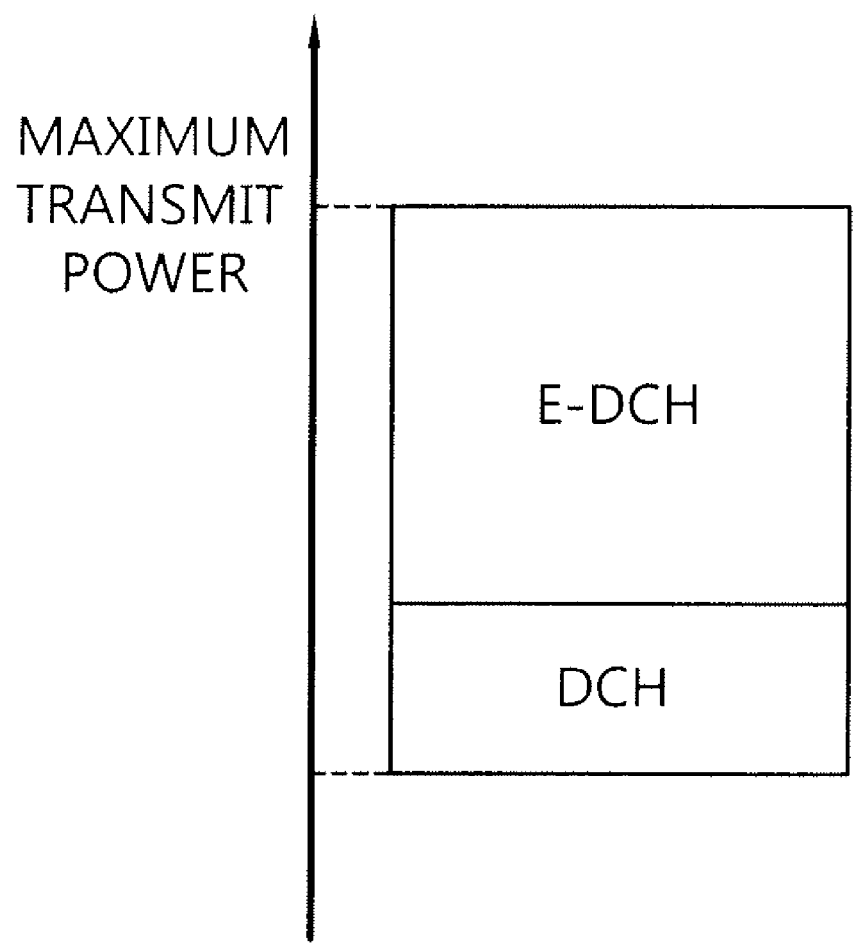
FIG. 5 shows power sharing of an E-DCH and a DCH.

FIG. 5 shows power sharing of an E-DCH and a DCH.

In uplink transmission, a UE cannot exceed allowed maximum transmit power. Since DCH transmission has a higher priority than E-DCH transmission, the UE can allocate power, which is obtained by subtracting power required for DCH transmission from the maximum transmit power, to E-DCH transmission. The UE performs E-TFC selection by using the power allocated to E-DCH transmission.

The UE determines power for the E-DCH transmission and an amount of data that can be transmitted by using the power. Then, an amount of data for each logical channel to be transmitted in a current TTI is determined in order of priorities of logical channels.

Now, determination on a size of an RLC PDU and generation of the RLC PDU will be described.

The size of the RLC PDU is determined by two methods, i.e., a method of using a fixed size and a method of using a flexible size.

In the method of using the fixed size, an RLC PDU is generated by segmenting in a fixed size without consideration of an amount of transmittable data. The RLC PDU delivered to a MAC layer is multiplexed to one MAC-i PDU in a MAC-i sublayer via a MAC-d sublayer and a MAC-is sublayer. If the amount of transmittable data is significantly greater than the size of the generated RLC PDU, many RLC PDUs are multiplexed to one MAC-i PDU. Since each RLC PDU includes a header, a greater overhead occurs due to a plurality of headers in comparison with a case where one large RLC PDU is multiplexed to the MAC-i PDU. If the amount of transmittable data is significantly smaller than the size of the generated RLC PDU, one RLC PDU is multiplexed by being segmented into several MAC-i PDUs. For one complete RLC PDU, a long latency may occur.

In the method of using the flexible size, the RLC PDU is adjusted so that it matches the amount of transmittable data. This method is supported by two methods. One is a 'full radio aware' method in which the amount of transmittable data in a current TTI is calculated and thereafter the RLC PDU is generated by adjusting the RLC PDU to match the data amount. The other is a 'partially radio aware' method in which the RLC PDU is pre-generated by an amount of data allowed to be transmitted in a current TTI and thereafter the pre-generated RLC PDU is transmitted in a next TTI.

Figure 6:
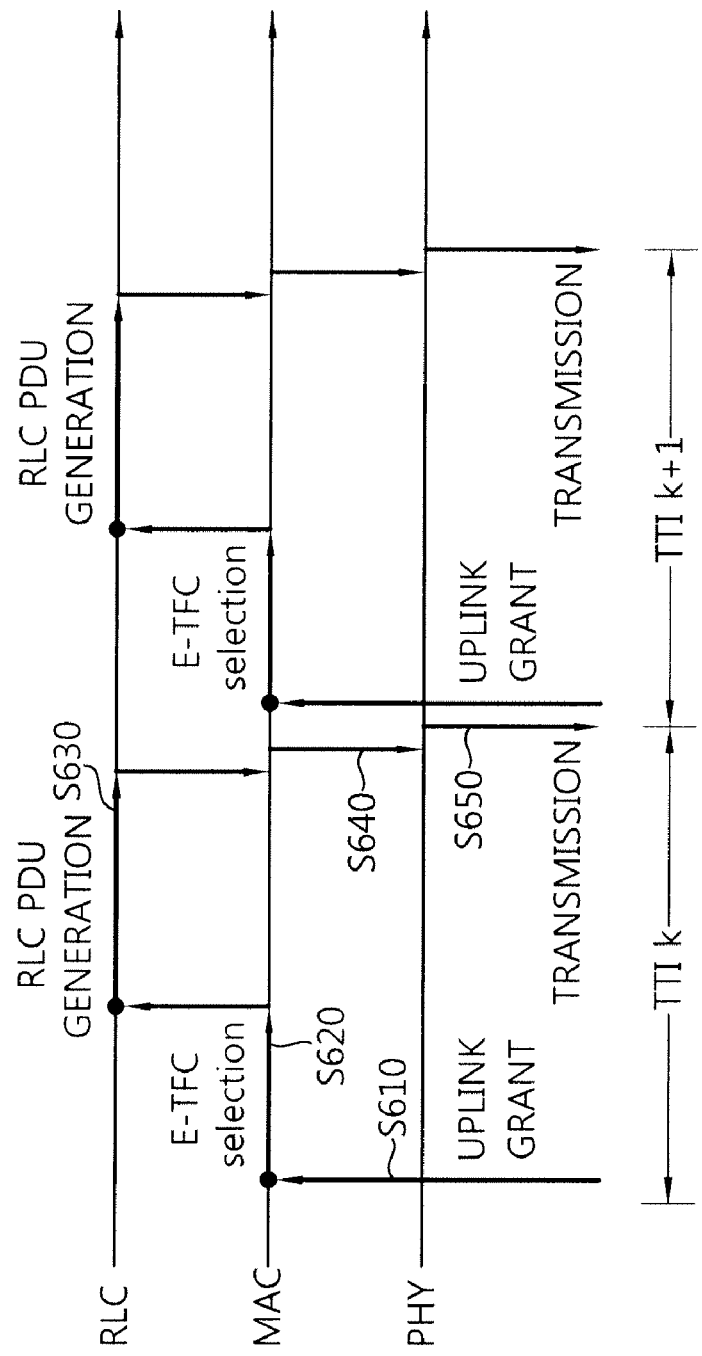
FIG. 6 shows transmission of a full radio aware radio link control (RLC) protocol data unit (PDU).

FIG. 6 shows transmission of a full radio aware RLC PDU.

A UE acquires an uplink grant from a BS (step S610). An amount of data to be transmitted is determined by performing E-TFC selection on the basis of the uplink grant (step S620). An RLC PDU is generated by adjusting the RLC PDU to match the determined data amount (step S630). The generated RLC PDU is multiplexed to a MAC PDU and is mapped to a physical channel (step S640). The MAC PDU is transmitted on the physical channel (step S650).

In the current TTI, the RLC PDU is generated by adjusting it to match the amount of data allowed to be transmitted by a grant, and the generated RLC PDU is delivered to a lower layer. Therefore, the generated RLC PDUs are adjusted to fill in the MAC PDU with an accurate size. However, the RLC PDU needs to be generated after acquiring the amount of data that can be transmitted during one TTI by performing E-TFC selection. In particular, hardware components with higher performance are necessary to support this method since ciphering that requires many computational operations is performed in the generation of the RLC PDU.

Figure 7:
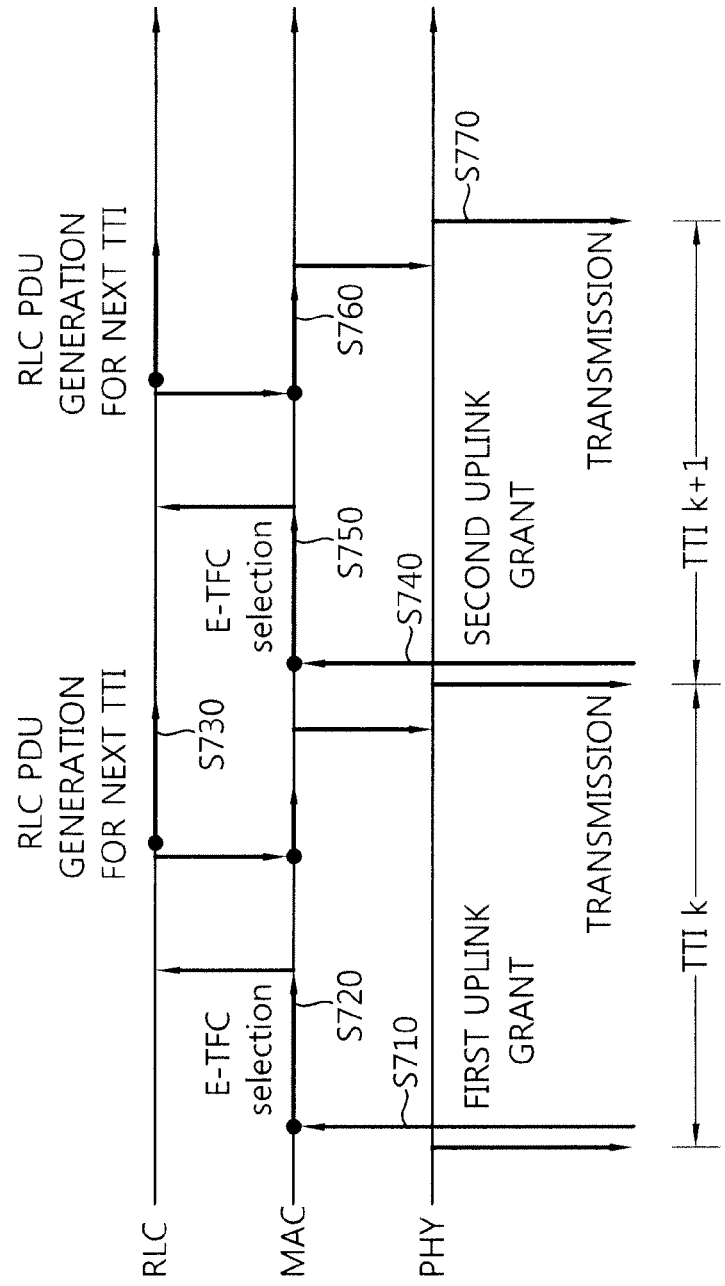
FIG. 7 shows transmission of a partially radio aware RLC PDU.

FIG. 7 shows transmission of a partially radio aware RLC PDU.

In a TTI k, a UE acquires a first uplink grant from a BS (step S710). On the basis of the first uplink grant, E-FTC selection is performed to determine a first amount of data to be transmitted (step S720). An RLC PDU is generated by adjusting the RLC PDU to match the determined first amount of data (step S730). The generated RLC is used not in a current TTI but in a next TTI. In the current TTI, a previously generated RLC PDU is multiplexed and transmitted.

In a TTI k+1, the UE acquires a second uplink grant from the BS (step S740). On the basis of the second uplink grant, E-FTC selection is performed to determine a second amount of data to be transmitted (step S750). The RLC PDU pre-generated in the TTI k is multiplexed to construct a MAC PDU (step S760). The MAC PDU has a size corresponding to the second amount of data. The MAC PDU is transmitted by being mapped to a physical channel (step S770).

In a method in which RLC PDUs are pre-generated on the basis of the data amount determined in a previous TTI, and thereafter transmission is performed by using the RLC PDUs in a next TTI, the previously pre-generated RLC PDUs are used in current TTI transmission. Therefore, a time required to generate the RLC PDUs can be reduced.

In general, a grant is valid only in a specific TTI. Therefore, since an amount of transmittable data may continuously change in every TTI, in order to generate RLC PDUs sufficiently, the partially radio aware RLC PDU may be pre-generated up to 4 times the data amount of the current TTI.

If the amount of transmittable data changes, the previously pre-generated RLC PDUs may have an amount of amount different from an amount of data that can be transmitted actually in the current TTI. A MAC layer can perform a segmentation operation which adjusts the RLC PDU to match a size of a MAC PDU to be transmitted. For example, when the amount of transmittable data is reduced in comparison with the previous TTI and thus the pre-generated RLC PDU is too great to fit to the MAC PDU, the pre-generated RLC PDU is segmented and is multiplexed to the MAC PDU. Segments of the RLC PDUs remaining after transmission are transmitted in a next TTI. If the amount of transmittable data increases in comparison with the previous TTI, the RLC PDUs are sequentially adjusted to the increased size of the MAC PDU, and last remaining parts are adjusted to match the size by segmenting next RLC PDUs according to a size of the remaining parts.

Figure 8:
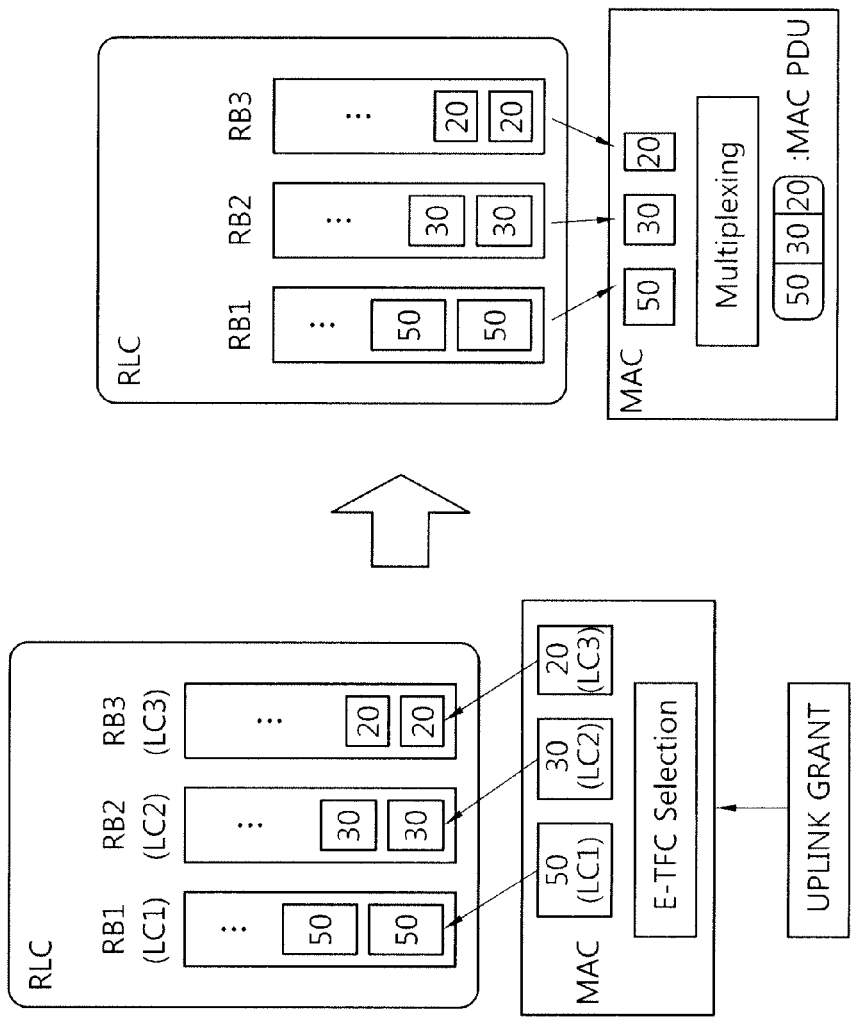
FIG. 8 shows an operation of each layer for a partially radio aware RLC PDU in a UMTS.

FIG. 8 shows an operation of each layer for a partially radio aware RLC PDU in a UMTS. There are three RBs (i.e., RB1, RB2, and RB3), and the RBs have the equal priority. A plurality of logical channels (i.e., LC1, LC2, and LC3) correspond to the respective RBs.

In a first TTI, on the basis of an acquired first uplink grant, a first amount of transmittable data is determined for each logical channel. For example, it is assumed that the LC1 is 50 bytes, the LC2 is 30 bytes, and the LC3 is 20 bytes.

An RLC layer pre-generates an RLC PDU corresponding to the first data amount determined for each logical channel. The LC1 generates an RLC PDU having a size of 50 bytes. The LC2 generates an RLC PDU having a size of 30 bytes. The LC3 generates an RLC PDU having a size of 20 bytes. More specifically, it can be considered that a size of a data field of the RLC PDU matches the amount of data, but this will not be particularly considered the following description.

In a second TTI, when a second amount of data allowed to be transmitted by a UE in the second TTI is determined on the basis of an acquired second uplink grant, an RLC PDU pre-generated by the RLC layer in the first TTI is submitted to a MAC layer. The amount of data in the submitted RLC PDUs may be greater than or equal to the second amount of data. For example, if the determined second amount of data is 100 bytes, since the three logical channels have the equal priority, an RLC PDU of the LC1 having a size of 50 bytes, an RLC PDU having a size of 30 bytes, and an RLC PDU having a size of 20 bytes are multiplexed to one MAC PDU.

If an amount of data remaining for each logical channel is less than 4 times an amount of data transmitted by a current grant, an RLC PDU can be additionally pre-generated according to the second amount of data transmitted in this time in each logical channel. The additionally pre-generated RLC PDUs are used from next transmission according to the order that they are generated. If an amount of data in the pre-generated RLC PDU is not enough, an RLC PDU can be additionally generated.

Now, a dual cell E-DCH will be described.

In the duel cell E-DCH, two carriers are used in E-DCH transmission. That is, one carrier used in the conventional UMTS is extended to multiple carriers. The carrier is defined with a center frequency and a bandwidth. One carrier may correspond to one frequency or one cell. The carrier can be simply referred to as a frequency.

Figure 9:
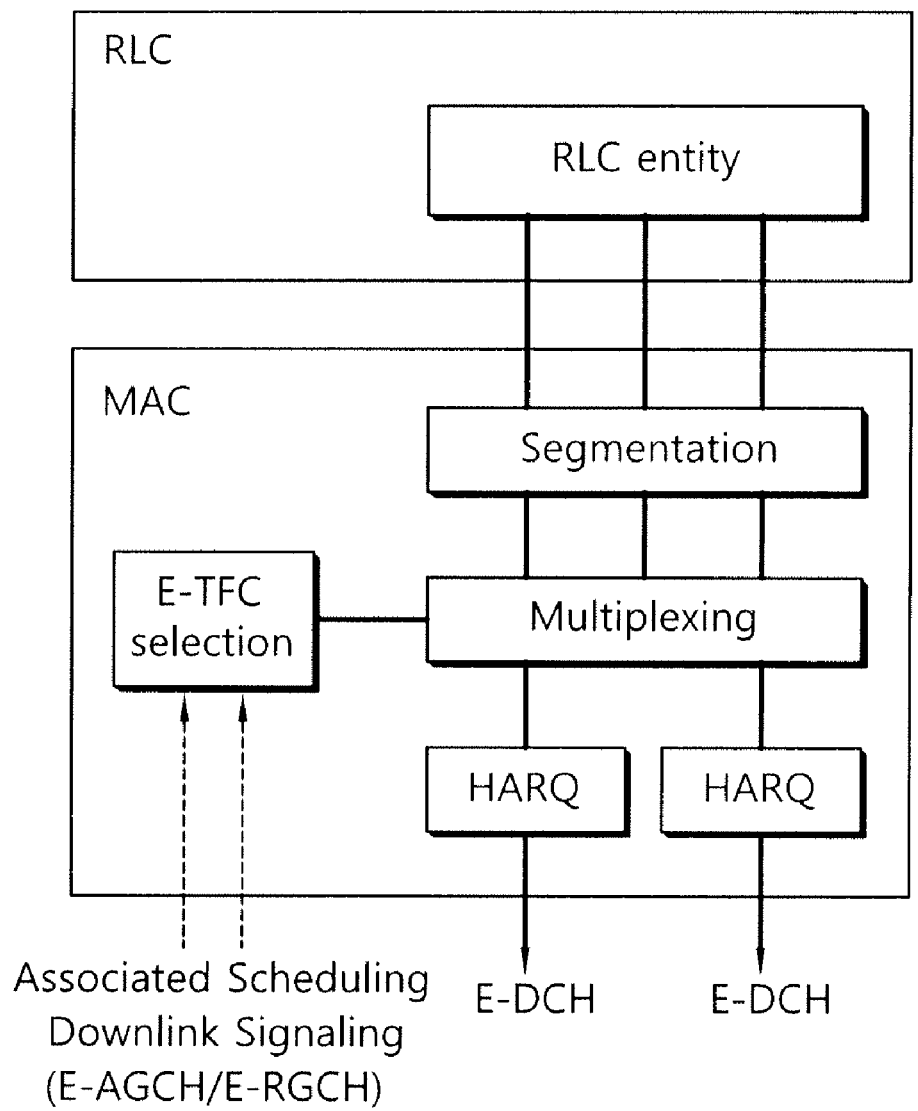
FIG. 9 shows a structure of a simplified duel cell E-DCH.

FIG. 9 shows a structure of a simplified duel cell E-DCH.

The introduction of the dual cell E-DCH has a great effect on a MAC layer. For example, in the dual cell E-DCH, uplink transmission can be performed through two E-DCHs. Since one HARQ entity manages one uplink transmission, for the duel cell E-DCH, the MAC entity needs to perform an operation in association with two HARQ entities. In addition, since a transport block is independently processed by each HARQ entity, in the dual cell E-DCH, a UE can transmit two transport blocks in one TTI through two carriers.

The carrier can be classified into an activated carrier and a deactivated carrier. The activated carrier is a carrier used in data transmission or reception. The deactivated carrier is a carrier in which only a minimum operation (e.g., measurement, etc.) is possible.

Alternatively, the carrier can be classified into a primary carrier and a secondary carrier. The primary carrier is a carrier in which an ACK/NACK signal for HARQ is transmitted. For example, even if there is a plurality of uplink carriers, the HARQ ACK/NACK signal for downlink data can be transmitted through one or more primary carriers among the plurality of uplink carriers. The uplink carrier in which the ACK/NACK signal for the HARQ is transmitted is the primary carrier, the remaining uplink carriers are the secondary carriers.

As descried above, a UE pre-generates a partially radio aware RLC PDU for one E-DCH by considering a previous radio state between the UE and a network.

However, with the introduction of the multiple carriers such as the dual cell E-DCH, the UE can simultaneously use a plurality of E-DCHs in one TTI. Since an uplink grant is given for each uplink frequency (or for each uplink carrier), the UE can have a plurality of uplink grants. An E-AGCH/E-RGCH for uplink grant reception exists independently for each frequency, and thus the UE receives a plurality of grants for a plurality of uplink frequencies. For the received uplink grants, a transmittable data amount is determined for each frequency by E-TFC selection.

Only one RLC entity exists for each logical channel similarly to the conventional single cell E-DCH transmission. However, this RLC entity may receive two amounts of transmittable data, and in this case, which amount will be used to generate RLC PDU has not been introduced yet.

In addition, in the conventional UMTS, partially radio aware RLC PDUs are generated more than four times an amount of data in a previous TTI. However, when the UE uses the plurality of uplink frequencies, an amount of data allowed to be transmitted by the plurality of uplink grants may be greater than an amount of data of the pre-generated RLC PDUs.

Therefore, a method of generating and transmitting a partially radio aware RLC PDU for a plurality of uplink grants will be described hereinafter when a UE acquires the plurality of uplink grants for a plurality of uplink frequencies.

More specifically, a data block transmission method will be described below regarding in what amount and how many RLC PDUs will be pre-generated by an RLC entity on the basis of the plurality of uplink grants.

The RLC PDU is generated in an RLC layer which is an upper layer of a MAC layer. Thus, the RLC PDU can be regarded as an upper data block, and the MAC PDU can be regarded as a lower data block.

Figure 10:
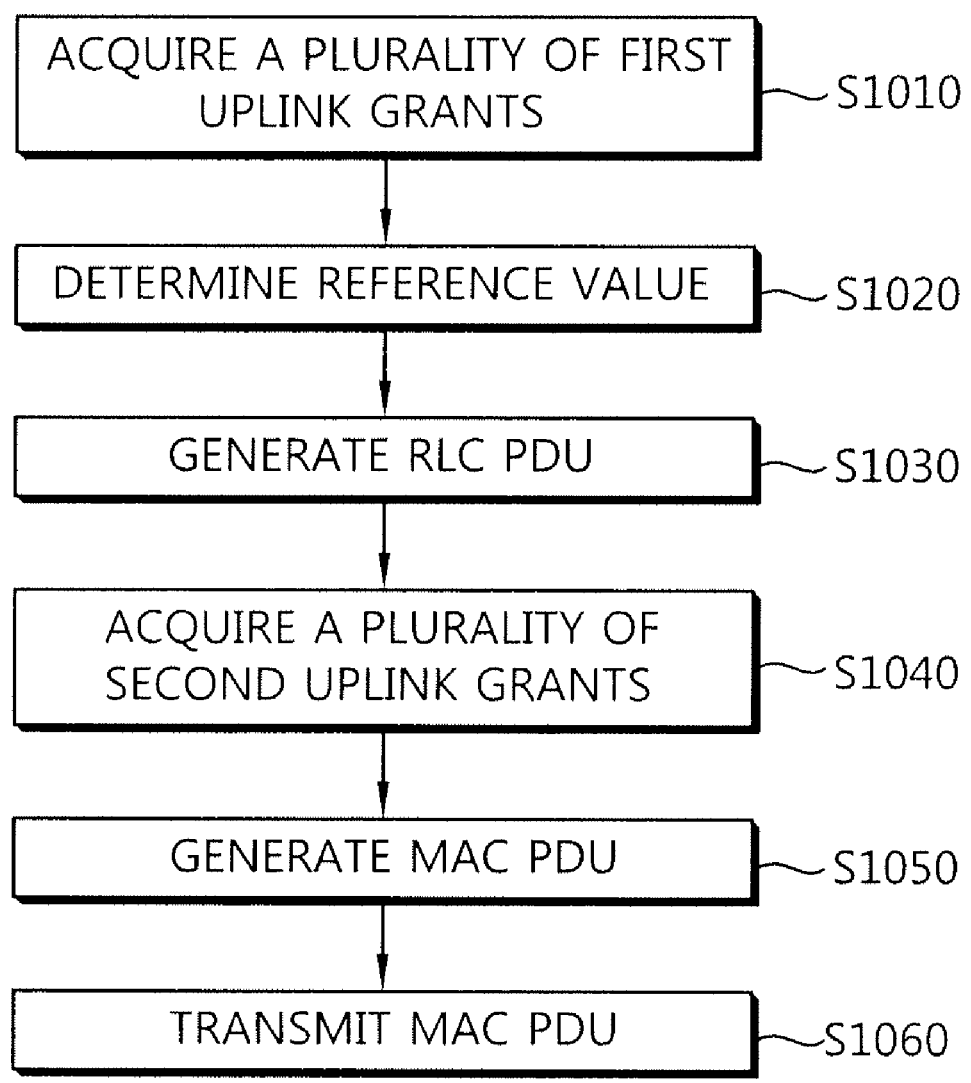
FIG. 10 is a flowchart showing a data block transmission method according to an embodiment of the present invention.

FIG. 10 is a flowchart showing a data block transmission method according to an embodiment of the present invention. This method can be performed by a UE.

In a first TTI, the UE acquires a plurality of first uplink grants for a plurality of uplink frequencies (step S1010). A first uplink grant may be a scheduled grant and/or a non-scheduled grant. The plurality of first uplink grants may be acquired by explicit signaling or implicitly.

The UE determines a reference value based on the plurality of first uplink grants (step S1020). The determination on the reference value will be described below.

The UE generates RLC PDU(s) on the basis of the reference value (step S1030).

In a second TTI, the UE acquires a plurality of second uplink grants for a plurality of uplink frequencies (step S1040).

The UE generates MAC PDUs on the basis of the plurality of second uplink grants by multiplexing pre-generated RLC PDUs (step S1050).

The UE transmits each MAC PDU on each uplink frequency (step S1060).

A MAC layer determines transmit power that can be used for E-DCH transmission. The determined transmit power is divided by the number of uplink grants, and the transmit power that can be used for E-DCH transmission is determined in each frequency. The MAC layer performs E-TFC selection within the transmit power allocated for each frequency band. A size of a MAC PDU that can be transmitted for each frequency band is determined by using the E-TFC selection, and a total sum of sizes of RLC PDUs to be transmitted in each RLC entity is determined. The MAC layer reports to each RLC entity the total sum of the sizes of the RLC PDUs to be transmitted in each RLC entity. Each RLC entity delivers the pre-generated RLC PDUs to the MAC layer by adjusting the RLC PDUs to match the total sum of the RLC PDU sizes reported by the MAC layer.

If the total sum of the pre-generated RLC PDUs is less than the total sum of the RLC PDU sizes reported by the MAC layer, the RLC layer delivers all of the pre-generated RLC PDUs to the MAC layer, and additionally generates RLC PDUs enough to supplement an insufficient amount and then delivers the generated RLC PDUs to the MAC layer. The RLC PDUs delivered to the MAC layer are multiplexed to the MAC PDU, sequentially starting from RLC PDUs of a logical channel having a high priority.

Now, a criterion of determining a reference value will be described.

First, a UE performs E-TFC selection on a plurality of uplink grants and thus determines an amount of data allowed to be transmitted by each uplink grant for each logical channel (or for each RB). The amount of data allowed to be transmitted by each uplink grant may be a maximum amount of data allowed to be transmitted by each uplink grant.

On the basis of the data amount determined for each uplink grant, the reference value can be determined as follows.

In a first method, a minimum of the determined data amounts can be determined as the reference value. A minimum between a first amount of data of a first uplink on a first uplink frequency and a second amount of data of a second uplink on a second uplink frequency is determined as the reference value.

In a second method, a maximum of the determined data amounts can be determined as the reference value. A maximum between a first amount of data of a first uplink on a first uplink frequency and a second amount of data of a second uplink on a second uplink frequency is determined as the reference value.

In a third method, an average of the determined data amounts can be determined as the reference value.

In a fourth method, an amount of data of an uplink grant for a primary frequency among a plurality of uplink grants can be determined as the reference value.

In a fifth method, a total sum of the determined data amounts can be determined as the reference value.

In the sixth method, an uplink frequency for determining the reference value among the plurality of uplink frequencies may be reported by a BS to a UE or may be predetermined. The UE may determine an amount of data of an uplink grant for a designated frequency as the reference value. If the UE fails to receive the designated uplink frequency from the BS, the UE may determine the reference value by using one of the first to fifth methods above.

When a minimum of the data amounts determined by the first to sixth methods above is determined as the reference value, even if an amount of data that can be transmitted for each TTI changes, there is a less possibility of segmenting the pre-generated RLC PDU, and complexity of multiplexing/demultiplexing in a MAC layer can be decreased. Therefore, among the proposed methods, the first method may be most effective.

Figure 11:
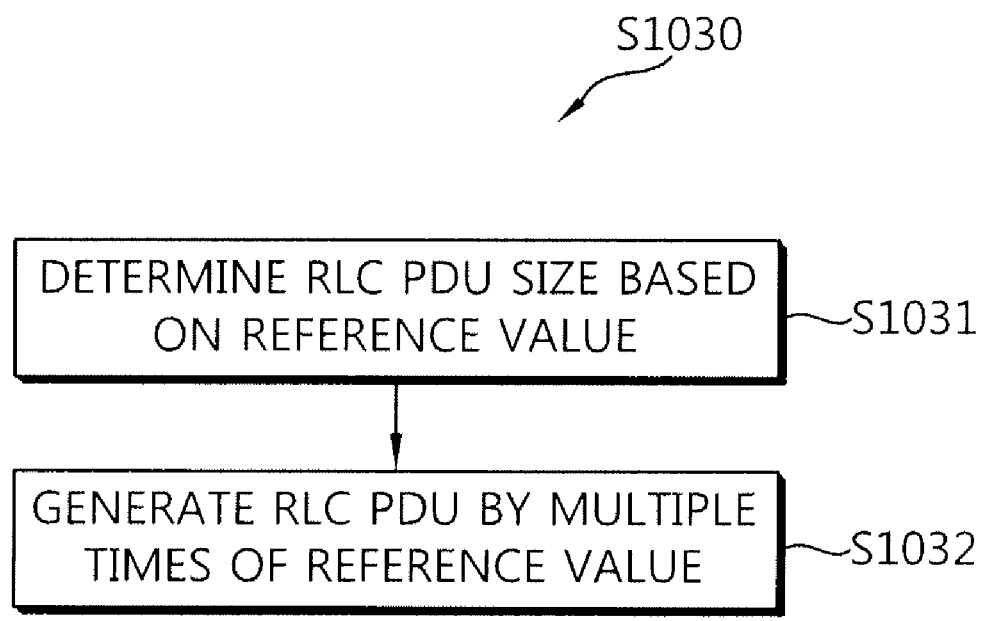
FIG. 11 is a flowchart showing RLC PDU generation of step S1030 of FIG. 10.

FIG. 11 is a flowchart showing RLC PDU generation of step S1030 of FIG. 10.

An RLC layer of a UE determines a size of an RLC PDU on the basis of a reference value (step S1031). It is assumed that there are a first uplink on a first uplink frequency and a second uplink on a second uplink frequency, and the first method is applied. The reference value is selected as a minimum of the first amount of data allowed to be transmitted by the first grant and the second amount of data allowed to be transmitted by the second grant. A size of a data field of the RLC PDU is determined so that each RLC PDU matches the reference value.

The RLC layer of the UE generates an RLC PDU so that an amount of data in the generated RLC PDU is multiple times the reference value (step S1032). The amount of data in the generated RLC PDU may be less than or equal to 8 times the reference value.

Conventionally, up to 4 times the RLC PDUs have been pre-generated. However, as the number of available frequencies increases, an amount of pre-generated RLC PDUs can increase. For example, if n is a constant and m is the number of uplink frequencies, an amount of the pre-generated RLC PDUs may be (n*m) times the reference value.

If the amount of data in the pre-generated RLC PDUs is less than 8 times the reference value, additional RLC PDUs may be pre-generated.

If a total size of the pre-generated RLC PDUs is greater than or equal to a specific size, an RLC entity may no longer generate the RLC PDU.

FIG. 12 shows an example of implementing the proposed method.

A MAC layer determines amounts of data that can be transmitted in a logical channel LC1 on a first uplink grant G1 and a second uplink grant G2, and transfers the amounts of data to a RLC layer. An amount of data for the first uplink grant G1 is 100 bytes, and an amount of data for the second uplink grant G2 is 200 bytes.

The RLC layer determines a reference value as a minimum between the above two amounts, i.e., 100 bytes. The logical channel LC1 of the RLC layer pre-generates an RLC PDU having a size corresponding to the reference value.

In a next TTI, the MAC layer generates MAC PDUs by multiplexing the pre-generated RLC PDU. It is shown herein that a MAC PDU 1210 having a size of 100 bytes and a MAC PDU 1220 having a size of 200 bytes are generated.

Figure 13:
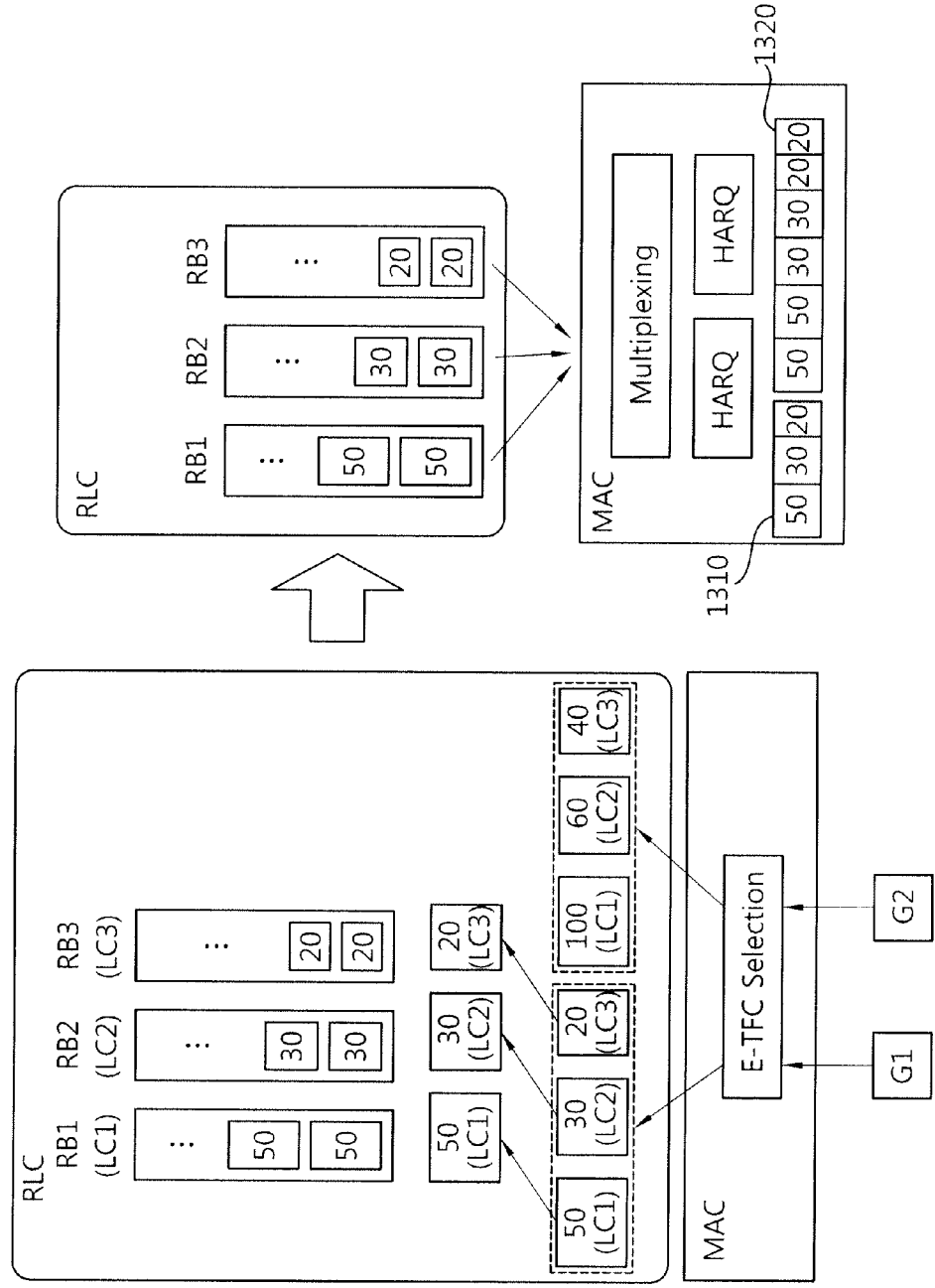
FIG. 13 shows another example of implementing the proposed invention.

FIG. 13 shows another example of implementing the proposed invention. In comparison with the example of FIG. 12, there are three logical channels having the same priority.

A MAC layer determines amounts of data that can be transmitted in logical channels LC1, LC2, and LC3 based on a first uplink grant G1 and a second uplink grant G2. It is assumed that an amount of data that can be transmitted based on the first uplink grant G1 is, for example, 50 bytes for the LC1, 30 bytes for the LC2, and 20 bytes for the LC3. In addition, it is also assumed that an amount of data that can be transmitted based on the second uplink grant G2 is, for example, 100 bytes for the LC1, 60 bytes for the LC2, and 40 bytes for the LC3.

When a reference value is a minimum between the two data amounts determined for each logical channel, a reference value of the LC1 is 50 bytes, a reference value of the LC2 is 30 bytes, and a reference value of the LC3 is 20 bytes. Therefore, the LC1 generates an RLC PDU having a size of 50 bytes, the LC2 generates an RLC PDU having a size of 30 bytes, and the LC3 generates an RLC PDU having a size of 20 bytes.

In a next TTI, the MAC layer generates MAC PDUs by multiplexing the pre-generated RLC PDU. It is shown herein that a MAC PDU 1310 having a size of 100 bytes and a MAC PDU 1320 having a size of 200 bytes are generated.

Figure 14:
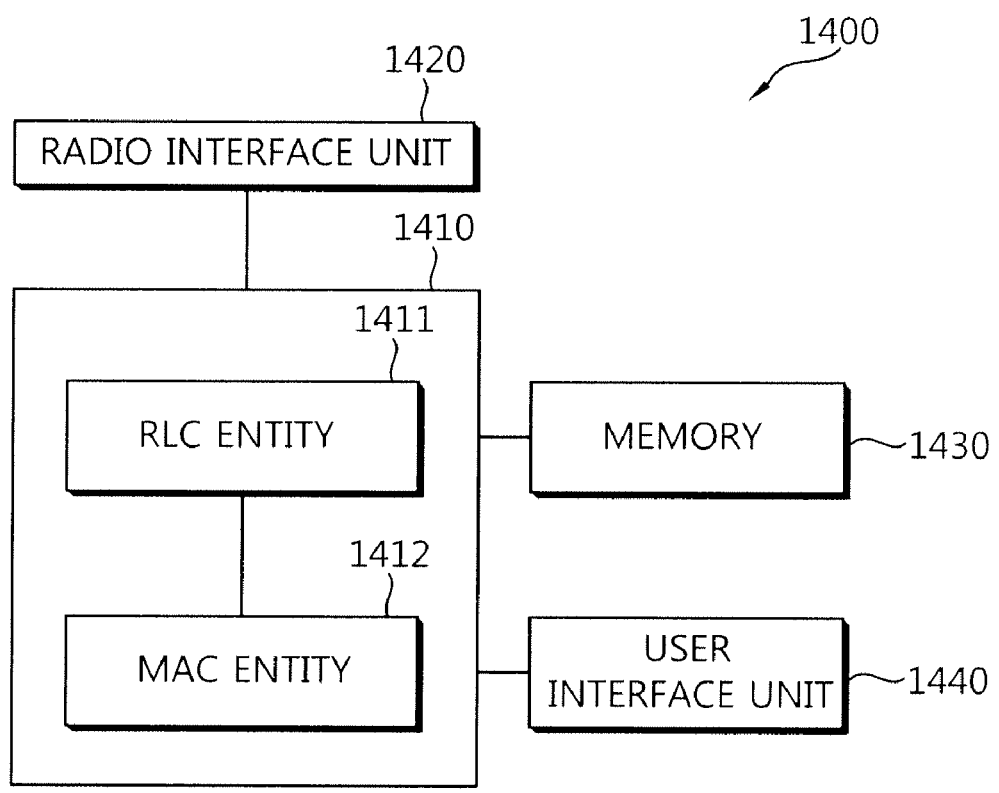
FIG. 14 is a block diagram showing a wireless apparatus for implementing an embodiment of the present invention.

FIG. 14 is a block diagram showing a wireless apparatus for implementing an embodiment of the present invention. A wireless apparatus 1400 may be a part of a UE.

The wireless apparatus 1400 includes a processor 1410, a radio interface unit 1420, a memory 1430, and a user interface unit 1440.

The processor 1410 implements layers of a radio interface protocol, and implements a MAC layer and an RLC layer. The processor 1410 may include a MAC entity 1411 for implementing the MAC layer and an RLC entity 1412 for implementing the RLC layer. The processor 1410 generates a data block (i.e., an RLC PDU and a MAC PDU) according to the embodiments of FIG. 10 and FIG. 11.

The radio interface unit 1420 is coupled to the processor and transmits data blocks on a plurality of frequencies. The memory 1430 is coupled to the processor and stores the data blocks. The user interface unit 1440 is coupled to the processor and provides a user interface.

The processor may include application-specific integrated circuit (ASIC), other chipset, logic circuit and/or data processing device. The memory may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of generating a data block for a plurality of uplink frequencies, the data block including a header and a data field, the method comprising:
    determining a size of the data field of the data block so that each data block matches a minimum of a first amount of data and second amount of data, the first amount of data being allowed to be transmitted by a first grant on a first uplink frequency, the second amount of data being allowed to be transmitted by a second grant on a second uplink frequency;
    determining whether an amount of data in pre-generated data blocks is less than eight times the minimum of the first amount of data and the second amount of data; and
    pre-generating additional data blocks only if the amount of data in the pre-generated data blocks is less than eight times the minimum of the first amount of data and the second amount of data so that a sum of the amount of the pre-generated data blocks and an amount of the additional data blocks becomes equal to eight times the minimum of the first amount of data and the second amount of data.

2. The method of claim 1, wherein the data block is a Radio Link Control Protocol Data Unit (RLC PDU).

3. The method of claim 2, wherein the first amount of data is a maximum amount of data allowed to be transmitted by the first grant.

4. The method of claim 3, wherein the second amount of data is a maximum amount of data allowed to be transmitted by the second grant.

5. The method of claim 2, wherein the generated RLC PDUs are submitted to a Medium Access Control (MAC) layer through a logical channel.

6. The method of claim 1, wherein the generated data blocks are transmitted in a later transmission time interval (TTI).

7. The method of claim 1, wherein the first uplink frequency is a primary uplink frequency and the second uplink frequency is a secondary uplink frequency.

8. A wireless apparatus comprising a processor for implementing a Radio Link Control (RLC) layer and generating a data block for a plurality of uplink frequencies, the data block including a header and a data field, wherein the processor is configured for:
    determining a size of the data field of the data block so that each data block matches a minimum of a first amount of data and second amount of data, the first amount of data being allowed to be transmitted by a first grant on a first uplink frequency, the second amount of data being allowed to be transmitted by a second grant on a second uplink frequency;
    determining whether an amount of data in pre-generated data blocks is less than eight times the minimum of the first amount of data and the second amount of data; and
    pre-generating additional data blocks only if the amount of data in the pre-generated data blocks is less than eight times the minimum of the first amount of data and the second amount of data so that a sum of the amount of the pre-generated data blocks and an amount of the additional data blocks becomes equal to eight times the minimum of the first amount of data and the second amount of data.

9. The wireless apparatus of claim 8, wherein the first amount of data is a maximum amount of data allowed to be transmitted by the first grant and the second amount is a maximum amount of data allowed to be transmitted by the second grant.

* * * * *